(12) United States Patent
Akiyama et al.

(10) Patent No.: US 10,105,912 B2
(45) Date of Patent: Oct. 23, 2018

(54) FIBER SUBSTRATE STACKING METHOD, MANUFACTURING METHOD OF ROLL OF FIBER SUBSTRATE GROUP, FIBER SUBSTRATE GROUP, AND AIRCRAFT

(71) Applicant: MITSUBISHI AIRCRAFT CORPORATION, Aichi (JP)

(72) Inventors: Hiromichi Akiyama, Tokyo (JP); Hideki Horizono, Tokyo (JP); Kazuaki Kishimoto, Tokyo (JP); Masahiro Shinya, Tokyo (JP); Shinya Suzukake, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 66 days.

(21) Appl. No.: 14/980,034

(22) Filed: Dec. 28, 2015

(65) Prior Publication Data

US 2016/0243770 A1 Aug. 25, 2016

(30) Foreign Application Priority Data

Feb. 19, 2015 (JP) .................................. 2015-30607

(51) Int. Cl.

| | |
|---|---|
| B29C 70/44 | (2006.01) |
| B29C 43/12 | (2006.01) |
| B29C 70/20 | (2006.01) |
| B32B 5/12 | (2006.01) |
| B32B 37/00 | (2006.01) |
| B29K 101/12 | (2006.01) |
| B29L 9/00 | (2006.01) |

(Continued)

(52) U.S. Cl.
CPC ............ *B29C 70/443* (2013.01); *B29C 43/12* (2013.01); *B29C 70/202* (2013.01); *B32B 5/12* (2013.01); *B32B 37/0076* (2013.01); *B29K 2101/12* (2013.01); *B29K 2105/101* (2013.01); *B29L 2009/00* (2013.01); *B32B 2037/1215* (2013.01); *B32B 2250/20* (2013.01); *B32B 2260/023* (2013.01); *B32B 2260/046* (2013.01); *B32B 2603/00* (2013.01)

(58) Field of Classification Search
CPC ................................................. B29K 2105/101
USPC ......................................................... 428/102
See application file for complete search history.

(56) References Cited

U.S. PATENT DOCUMENTS

| | | | |
|---|---|---|---|
| 2004/0241415 A1 | 12/2004 | Wadahara et al. | |
| 2004/0247845 A1* | 12/2004 | Abe ........................ | B29C 70/08 428/223 |

(Continued)

FOREIGN PATENT DOCUMENTS

| | | |
|---|---|---|
| JP | 2005-22396 A | 1/2005 |
| JP | 53-22920 B2 | 7/2013 |

*Primary Examiner* — Brent T O'Hern
(74) *Attorney, Agent, or Firm* — Pearne & Gordon LLP

(57) ABSTRACT

The present invention aims to sufficiently impregnate each layer of a fiber substrate group composed of fiber substrates, which are used for fiber-reinforced resin molding by a resin injection method, with a resin. To successively stack a plurality of fiber substrates, each of which has arrayed fiber bundles and is a material composing a fiber-reinforced resin along with a resin, with their fiber bundles oriented in the same direction, the plurality of fiber substrates are integrated in a state where border zones between the fiber bundles adjacent to each other in an array direction are aligned with one another among the fiber substrates.

13 Claims, 9 Drawing Sheets

(51) Int. Cl.
    *B32B 37/12*    (2006.01)
    *B29K 105/10*   (2006.01)

(56) References Cited

U.S. PATENT DOCUMENTS

2009/0029612 A1* 1/2009 Tsuji .................. B29B 11/16
                                                            442/59
2010/0108245 A1  5/2010 Nishiyama et al.

* cited by examiner

FIBER SUBSTRATE STACKING METHOD, MANUFACTURING METHOD OF ROLL OF FIBER SUBSTRATE GROUP, FIBER SUBSTRATE GROUP, AND AIRCRAFT

BACKGROUND OF THE INVENTION

Field of the Invention

The present invention relates to a method of stacking fiber substrates which are used for fiber-reinforced resin molding by a resin injection method, and to a fiber substrate group composed of stacked fiber substrates.

Description of the Related Art

Vacuum assisted resin transfer molding (VaRTM) in which a resin (matrix resin) is injected into a cavity depressurized by evacuation has been practiced as a cost-competitive technique of fiber-reinforced resin molding, and structural members of an aircraft molded by VaRTM have been put into practical use.

When VaRTM is performed, a resin diffusion medium in a mesh form which presents a lower flow resistance to the resin than a fiber substrate is disposed on the surface of the fiber substrate to enhance the impregnation property of the resin (Japanese Patent No. 5322920). The resin injected into the cavity passes through the resin diffusion medium and is diffused along the surface of the fiber substrate, and the fiber substrate is further impregnated with the resin in the thickness direction.

A unidirectional fiber substrate in which bundles of fibers are disposed in parallel with one another is used as the fiber substrate (Japanese Patent Laid-Open No. 2005-22396). A number of the fiber substrates equivalent to the thickness of a member to be molded are stacked.

It is necessary to impregnate each layer of fiber substrates in a stack, which is composed of the plurality of fiber substrates, with a resin so that the resin spreads throughout the entire stack. The resin passes through a border zone between one fiber bundle and another of the fiber substrate, and the succeeding layer of the fiber substrate is impregnated with the resin.

However, the impregnation property of the resin deteriorates when the fiber substrates with their fiber bundles oriented in the same direction are successively stacked.

As shown in FIG. 9, when fiber bundles 21 of one fiber substrate 20 are disposed respectively on and along border zones 21B between adjacent fiber bundles 21 of another fiber substrate 20, the flow of the resin from the one fiber substrate 20 toward the other fiber substrate 20 disposed below is interrupted. Thus, the stack is more likely to be left unimpregnated in some portions as the number of the fiber substrates successively stacked with their fiber bundles 21 oriented in the same direction increases.

Therefore, the present invention aims to sufficiently impregnate each of stacked fiber substrates with a resin.

SUMMARY OF THE INVENTION

According to the present invention, there is provided a fiber substrate stacking method for stacking a plurality of fiber substrates each of which has arrayed fiber bundles and is a material composing a fiber-reinforced resin along with a resin (matrix resin), wherein the plurality of fiber substrates are integrated in a state where border zones between the fiber bundles adjacent to each other in an array direction are aligned with one another among the fiber substrates which are successively stacked with their fiber bundles oriented in the same direction.

According to the present invention, even when the fiber substrates are successively stacked with their fiber bundles oriented in the same direction, these fiber substrates are integrated in a state where the border zones between the fiber bundles are aligned with one another. Thus, when the fiber substrates are impregnated with a resin by a resin injection method, a flow of the resin among the fiber substrates is secured through the border zones. Accordingly, it is possible to sufficiently impregnate each of the stacked fiber substrates with the resin.

In the present invention, the number of the fiber substrates to be successively stacked with their fiber bundles oriented in the same direction is not restricted, which offers greater design flexibility of a fiber-reinforced resin molded article. This also contributes to characteristics improvement of the fiber-reinforced resin molded article.

To integrate the plurality of fiber substrates, it is possible to bond together the plurality of fiber substrates by heating and plasticizing particles of a thermoplastic resin scattered over the surfaces of the fiber bundles.

The meaning of "particles of a thermoplastic resin" in the present invention includes not only particles which are entirely formed of a thermoplastic resin but also particles which are mainly composed of a thermoplastic resin and have thermoplasticity as a whole.

Alternatively, it is also possible to bond together the plurality of fiber substrates through a sheet, which has thermoplasticity at least in the thickness direction of the fiber substrate and allows passage of the resin, by disposing the sheet between the fiber substrates and heating and plasticizing the sheet.

Otherwise, the plurality of fiber substrates can be integrated with an arbitrary adhesive or by an appropriate method such as stitching with fibers.

The present invention provides a manufacturing method of a roll of a fiber substrate group in which a plurality of fiber substrates, each of which has arrayed fiber bundles and is a material composing a fiber-reinforced resin along with a resin, are successively stacked with their fiber bundles oriented in the same direction, the method including the steps of: obtaining a form of the fiber substrate using the fiber bundles; integrating the plurality of fiber substrates in a state where border zones between the fiber bundles adjacent to each other in an array direction are aligned with one another; and rolling up the fiber substrate group including the integrated fiber substrates.

In the step of integrating the plurality of fiber substrates, it is preferable that the plurality of fiber substrates are stitched together with fibers, which are passed between the fiber bundles adjacent to each other in the array direction, in a state where the border zones between the fiber bundles are aligned with one another.

In this specification, the meaning of "stitch" also includes weaving fibers into the fiber bundle group through gaps between the fiber bundles adjacent to each other in the array direction.

After forming the fiber substrates, separately producing a roll of a fabric of fiber substrates by stacking a plurality of fiber substrates each including fiber bundles oriented in the same direction and stitching together the fiber substrates with other fibers into a fabric of fiber substrates can save the trouble of integrating the stacked fiber substrates each including the fiber bundles oriented in the same direction during the manufacture of parts, so that the manufacture of the parts can be facilitated.

A fiber-reinforced resin molding method of the present invention includes the steps of: forming a stack of a plurality of fiber substrates including the fiber substrates which are stacked by the above-described fiber substrate stacking method; and depressurizing the inside of a cavity, where the stack is disposed, and injecting a matrix resin into the cavity to impregnate each of the fiber substrates constituting the stack with the resin.

In the fiber-reinforced resin molding method of the present invention, it is preferable that, before the step of impregnating the fiber substrates with the resin is performed, a resin diffusion medium which presents a lower flow resistance to the resin than the fiber substrates is disposed on top of the stack.

Then, it is possible to take a large part of the resin injected into the cavity into the resin diffusion medium, and control the flow of the resin so that the resin is directed from the resin diffusion medium toward the lower side of the stack so as to move sequentially into the layers through the border zones of the fiber bundles. Thus, it is possible to efficiently impregnate the entire stack with the resin.

A fiber substrate group of the present invention includes a plurality of fiber substrates each of which has arrayed fiber bundles and is a material composing a fiber-reinforced resin along with a resin, wherein the plurality of fiber substrates are successively stacked with their fiber bundles oriented in the same direction, and are integrated in a state where border zones between the fiber bundles adjacent to each other in an array direction are aligned with one another.

To integrate the plurality of fiber substrates, it is possible to bond together the plurality of fiber substrates with a thermoplastic resin, or to stitch together the plurality of fiber substrates with fibers passed between the fiber bundles adjacent to each other in the array direction.

A fiber-reinforced resin molded article of the present invention is a stack of a plurality of the above-described fiber substrate groups impregnated with a resin.

An aircraft of the present invention includes a structural member as the above-described fiber-reinforced resin molded article.

According to the present invention, it is possible to sufficiently impregnate each of stacked fiber substrates with a resin.

DETAILED DESCRIPTION OF THE PREFERRED EMBODIMENTS

In the following, embodiments of the present invention will be described with reference to the accompanying drawings.

First Embodiment

A fiber-reinforced resin molded article according to this embodiment is molded from a fiber-reinforced resin in which fiber substrates are impregnated with a resin by VaRTM. Such a fiber-reinforced resin molded article can be used, for example, as a structural member of an aircraft.

Figure 1:
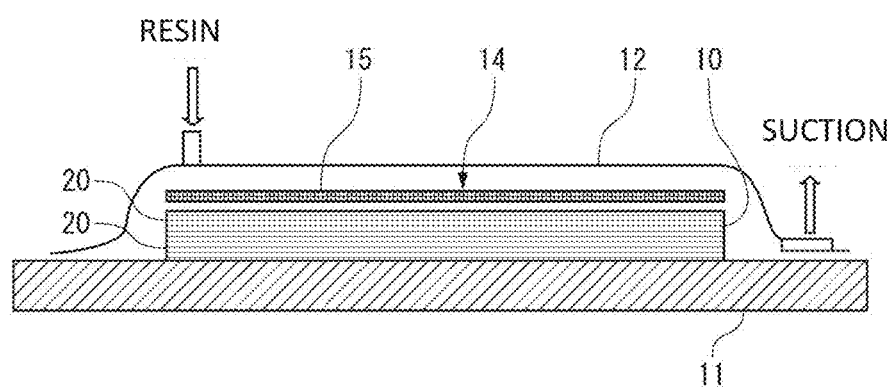
FIG. 1 is a view illustrating impregnation of fiber substrates, which are used for fiber-reinforced resin molding by VaRTM, with a resin.

A stack 10 of fiber substrates 20 shown in FIG. 1 is used as a material composing a fiber-reinforced resin which forms a fiber-reinforced resin molded article.

The stack 10 is the plurality of fiber substrates 20 in a sheet form stacked in the thickness direction. A number of the fiber substrates 20 equivalent to the thickness of the fiber-reinforced resin molded article to be molded are stacked.

When fiber-reinforced resin molding is performed using the stack 10, as shown in FIG. 1, the stack 10 is disposed inside a sealed cavity 14 between a molding die 11, which corresponds to the shape of the molded article, and a bag film 12 (stack disposition step). Then, the inside of the cavity 14 is depressurized by evacuation to thereby inject a resin from a resin supply source into the cavity 14 and impregnate the fiber substrates 20 of the stack 10 with the resin (resin impregnation step).

For example, a thermosetting resin, such as epoxy resin, polyimide, polyurethane, or unsaturated polyester resin, can be preferably used as the resin with which the fiber substrates 20 are to be impregnated (matrix resin).

When the fiber substrates 20 have been impregnated with the resin, the matrix resin is heated and cured by a heating device, such as a heater mat or an oven, to mold the fiber-reinforced resin.

By continuously depressurizing the inside of the cavity 14 throughout the process of impregnation and curing of the resin, it is possible to pressurize and densify the fiber substrates 20 and the resin under the differential pressure between the inside of the cavity 14 and atmospheric air.

It is preferable that a resin diffusion medium 15, which diffuses the resin injected into the cavity 14, is disposed on top of the stack 10. Since the resin diffusion medium 15 presents a lower flow resistance to the resin than the fiber substrates 20, the resin diffusion medium 15 functions as a resin channel. For example, a mesh-like member can be used as the resin diffusion medium 15.

The resin injected into the cavity 14 passes through the resin diffusion medium 15 and flows along the surface of the stack 10, and the layers of the stack 10 are sequentially impregnated with the resin.

Figure 2A:
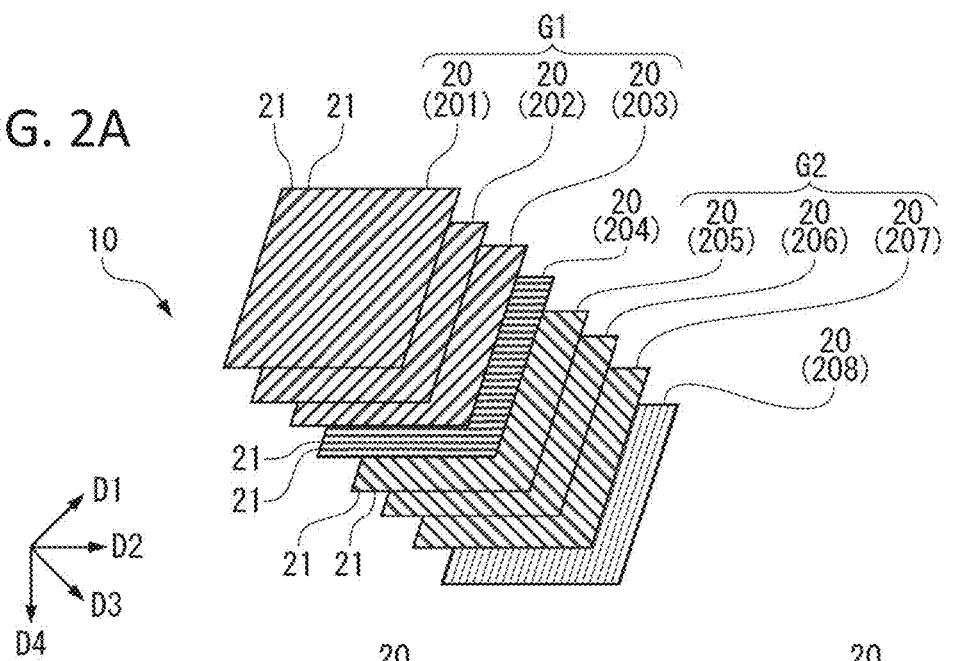
FIG. 2A is a view showing the orientations of fiber bundles of the plurality of fiber substrates.

As shown in FIG. 2A, the fiber substrates 20 constituting the stack 10 are unidirectional fiber substrates in which fiber bundles 21 are arrayed in parallel with one another. The fiber bundles 21 contained in the fiber substrates 20 extend in a single direction.

Figure 3:
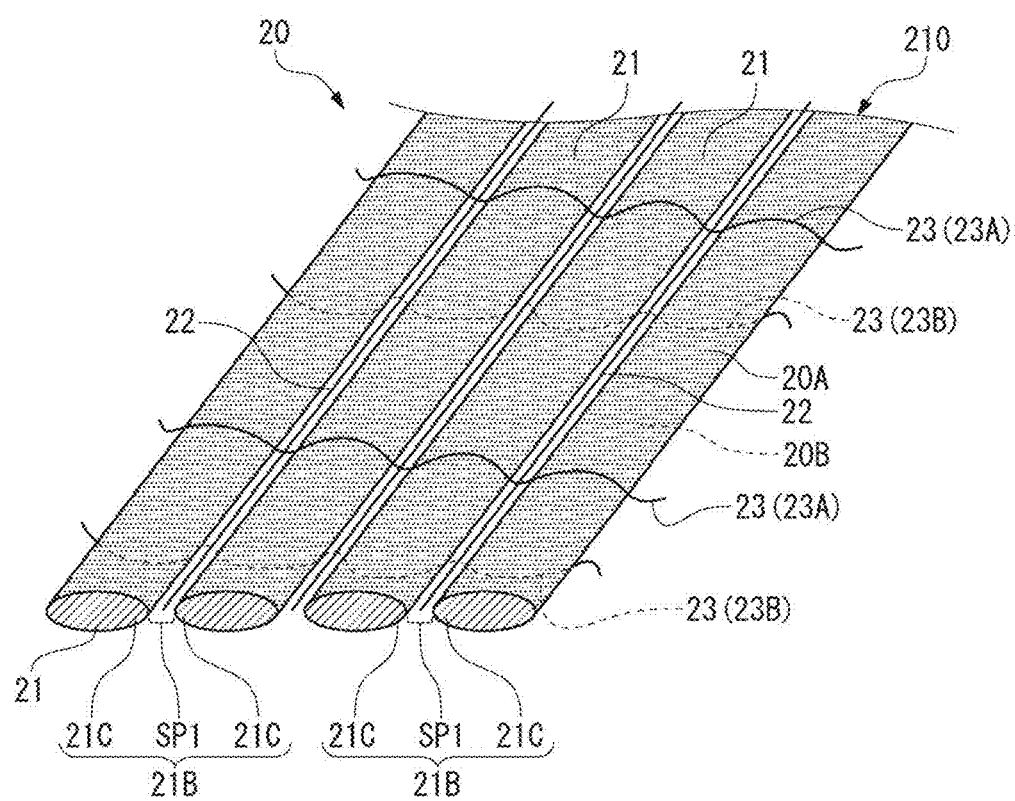
FIG. 3 is a perspective view showing the configuration of the fiber substrate.

As shown in FIG. 3, the fiber substrate 20 has a fiber bundle group 210 composed of the plurality of fiber bundles 21, and auxiliary fibers 22, 23 which hold together the fiber bundles 21 of the fiber bundle group 210 in an arrayed state. The fiber bundle group 210 and the auxiliary fibers 22, 23 are formed as an integral fabric.

The fiber bundle 21 is a large number of reinforcing fibers paralleled in the same direction. Appropriate fibers, such as carbon fibers, glass fibers, or aramid fibers, can be used as the reinforcing fibers.

The fiber bundle 21 is pressurized and formed in a flat shape. The width of the fiber bundle 21 is several millimeters to approximately 20 millimeters, for example, and the thickness of the fiber bundle 21 is 0.05 millimeter to several millimeters, for example. The thickness of the fiber bundle 21 roughly corresponds to the thickness of the fiber substrate 20. It is preferable that a sizing agent composed of an epoxy resin, for example, is applied to the surfaces of the single fibers constituting the fiber bundle 21 so that the single fibers do not come loose.

The fiber bundles 21 are arrayed at a regular pitch. In this embodiment, there is a space Sp1 in each border zone 21B between the fiber bundles 21 adjacent to each other in the array direction, but it is not absolutely necessary that there is the space Sp1 in each border zone 21B.

The border zone 21B functions as a channel through which a matrix resin flows, and as shown in FIG. 3, includes the space Sp1 between the adjacent fiber bundles 21, 21 and an end edge 21C in the width direction of each of the fiber bundles 21, 21. Since the density of the single fibers is lower at the end edge 21C of the fiber bundle 21 than in a center part in the width direction of the fiber bundle 21, the matrix resin can pass through the end edge 21C.

As shown in FIG. 3, the longitudinal fibers 22, which are auxiliary fibers, extend along the length direction of the fiber bundles 21 at the positions of the border zones 21B.

On the other hand, the plurality of lateral fibers 23, which are auxiliary fibers, are disposed along the width direction (array direction) of the fiber bundles 21. In a plan view of the fiber substrate 20, the longitudinal fibers 22 and the lateral fibers 23 form a lattice shape.

The lateral fibers 23 are disposed so as to transverse the fiber bundle group 210 on one surface of the fiber substrate 20 while passing under the longitudinal fibers 22 at the positions of the border zones 21B. For example, the lateral fibers 23 located on a first surface 20A of the fiber substrate 20 extend along the first surface 20A while passing under the longitudinal fibers 22 at the positions of the border zones 21B. The lateral fibers 23 located on a second surface 20B of the fiber substrate 20 extend along the second surface 20B while passing under the longitudinal fibers 22 at the positions of the border zones 21B.

The longitudinal fibers 22 and the lateral fibers 23 integrally hold together the fiber bundles 21 of the fiber bundle group 210 so that the fiber bundles 21 do not separate from one another.

As the longitudinal fibers 22 and the lateral fibers 23, fiber bundles composed of glass fibers, carbon fibers, or the like can be used, and such bundles are thinner than the fiber bundles 21 which have the strength of the fiber-reinforced resin molded article. The same applies to auxiliary fibers 27, 28, 29 to be described later.

The longitudinal fibers 22 and the lateral fibers 23 prevent displacement of the fiber bundles 21.

The fiber substrate 20 has a strength in the length direction of the fiber bundles 21. The fiber substrate 20 is oriented on the basis of the direction of the fiber bundles 21 so that the strength is obtained by the fiber substrate 20 in a plurality of directions as required for the molded article.

FIG. 2A shows one example of the orientations of the fiber substrates 20 of the stack 10.

The stack 10 includes a plurality of fiber substrates 20 (201 to 208). The fiber substrates 201 to 208 are stacked in this order in the thickness direction of the stack 10. Where the fiber substrates 201 to 208 are not particularly distinguished from one another, these substrates will be referred to as simply the fiber substrates 20.

All the fiber substrates 201 to 203 are disposed with their fiber bundles 21 oriented in a first direction D1. These fiber substrates will be referred to as a fiber substrate group G1.

The fiber substrate 204 is disposed with its fiber bundles 21 oriented in a second direction D2.

All the fiber substrates 205 to 207 are disposed with their fiber bundles 21 oriented in a third direction D3. These fiber substrates will be referred to as a fiber substrate group G2.

The fiber substrate 208 is disposed with its fiber bundles 21 oriented in a fourth direction D4.

With reference to the fourth direction D4 (0°), angles formed by the third direction D3, the second direction D2, and the first direction D1 with respect to the fourth direction D4 can be set to 45°, 90°, and −45°, respectively.

As described above, the stack 10 includes the fiber substrate group G1 and the fiber substrate group G2 each composed of the fiber substrates 20 successively stacked with their fiber bundles 21 oriented in the same direction.

Figure 9:
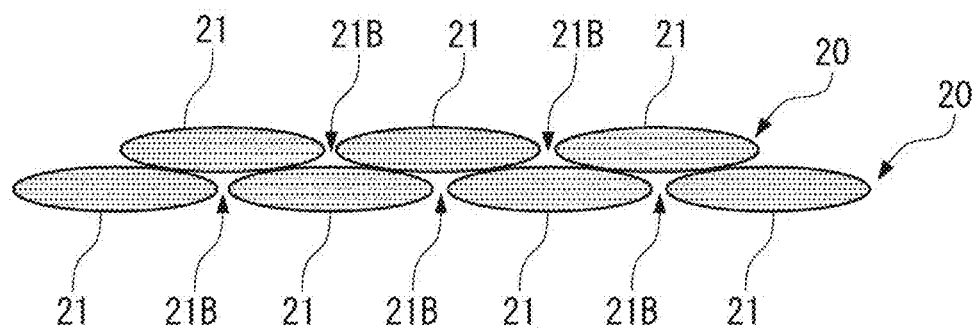
FIG. 9 is a partial cross-sectional view of a fiber substrate group according to a comparative example.

Suppose that, in the case where the fiber substrates 20 are successively disposed with their fiber bundles 21 oriented in the same direction, the fiber bundles 21 of one layer of the fiber substrate 20 are disposed on and along the border zone 21B between the fiber bundles 21, 21 of a preceding layer of the fiber substrate 20 as shown in FIG. 9. Then, the resin channel between the layers is blocked along the entire length of the fiber bundles 21.

Figure 2B:
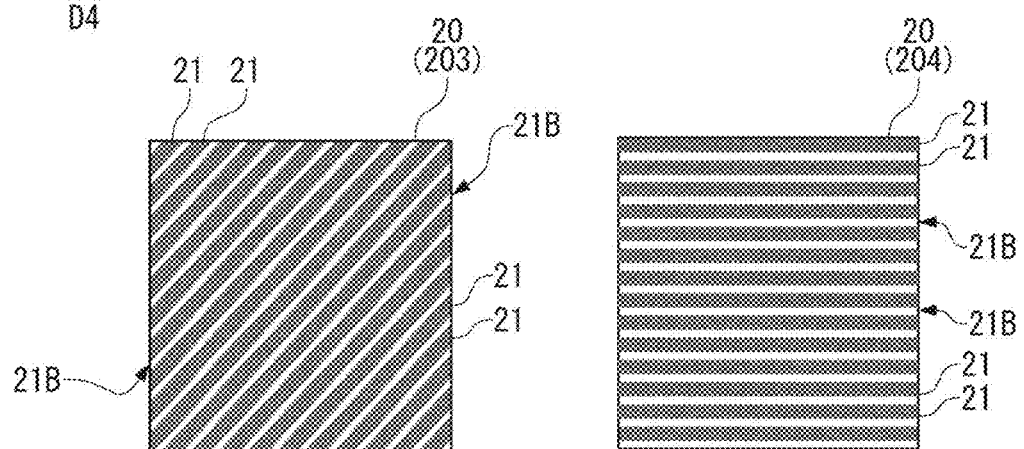
FIG. 2B is a view showing the fiber substrates with different orientations.
Figure 2B:
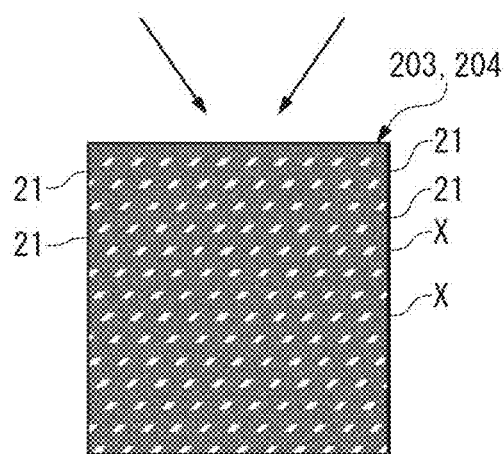

By contrast, in the case where the fiber substrates are stacked with their fiber bundles 21 oriented in different directions from each other like the fiber substrate 203 and the fiber substrate 204 shown in FIG. 2A, there are resin channels left between the layers in portions X (white portions), where the border zones 21B between the fiber bundles 21, 21 of the fiber substrate 203 and the border zones 21B between the fiber bundles 21, 21 of the fiber substrate 204 intersect with each other, as shown in FIG. 2B which selectively shows the fiber substrates 203, 204.

In this embodiment, to allow the resin to follow in the interlayer direction as well, the border zones 21B between the fiber bundles 21, 21 are aligned with one another among the fiber substrates 20 which are successively stacked with their fiber bundles 21 oriented in the same direction.

Figure 4A:
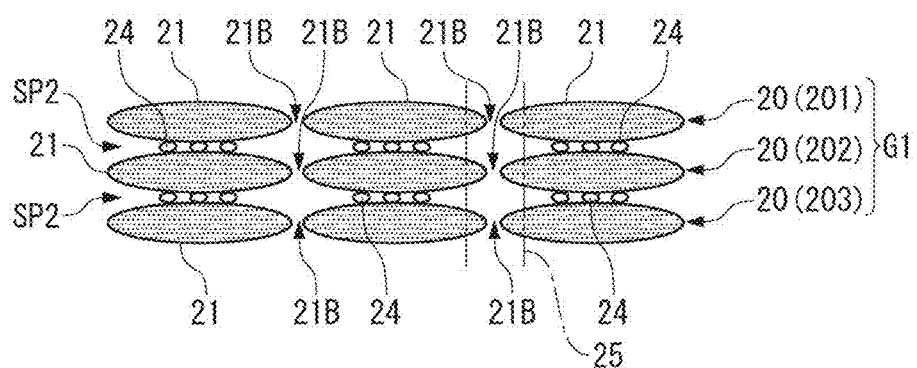
FIG. 4A, showing a feature of a first embodiment, is a partial cross-sectional view of a fiber substrate group composed of the fiber substrates successively stacked with their fiber bundles oriented in the same direction, in which auxiliary fibers are not shown.

As shown in FIG. 4A, the positions of the border zones 21B between the fiber bundles 21, 21 adjacent to each other in the array direction coincide with one another among the fiber substrate 201 to the fiber substrate 203 which are successively stacked with their fiber bundles 21 oriented in the same direction.

Since the fiber bundles 21 are arrayed at a regular pitch, all the border zones 21B between all the adjacent fiber bundles 21 of the fiber substrate 201 coincide with the border zones 21B of the fiber substrate 202.

In addition, the border zones 21B also coincide between the fiber substrate 202 and the fiber substrate 203.

Thus, resin channels 25, which run in the stack direction (thickness direction) of the fiber substrate group G1, are formed by the border zones 21B of the fiber substrate 201, the border zones 21B of the fiber substrate 202, and the border zones 21B of the fiber substrate 203.

While not shown, as in the fiber substrate group G1, the border zones 21B coincide among the fiber substrates 205 to 207 of the fiber substrate group G2 (FIG. 2A), too, so that the resin channels 25 running in the stack direction of the fiber substrate group G2 are formed.

The fiber substrates 201 to 203 of the fiber substrate group G1 are integrated with their border zones 21B coinciding with one another as shown in FIG. 4A. The integrated fiber substrates 201 to 203 are not only easy to handle, but can also be prevented from undergoing displacement of the border zones 21B among the fiber substrates 201 to 203.

The fiber substrates 201 to 203 are bonded together by heating and plasticizing a thermoplastic powder 24 which is scattered over at least one surface of each fiber bundle 21. Even after bonding through plasticization of the thermoplastic powder 24, there are clearances Sp2, which allow passage of the resin, left between the stacked fiber substrates.

For example, a thermoplastic resin, such as nylon, polyethylene, polystyrene, polyvinyl chloride, PEEK (polyether ether ketone resin), or PES (polyether sulphone resin), can be used as the material of the thermoplastic powder 24.

Similarly, the fiber substrates 205 to 207 of the fiber substrate group G2 are integrated by being bonded together through plasticization of the thermoplastic powder 24.

As shown in FIG. 1, when the stack 10 is disposed inside the cavity 14 and the resin is injected into the cavity 14 by evacuation, a large part of the resin is introduced more preferentially into the resin diffusion medium 15 than into the fiber substrates 20. Then, with the resin flowing from the resin diffusion medium 15, each layer of the stack 10 is impregnated as described below.

Figure 4B:
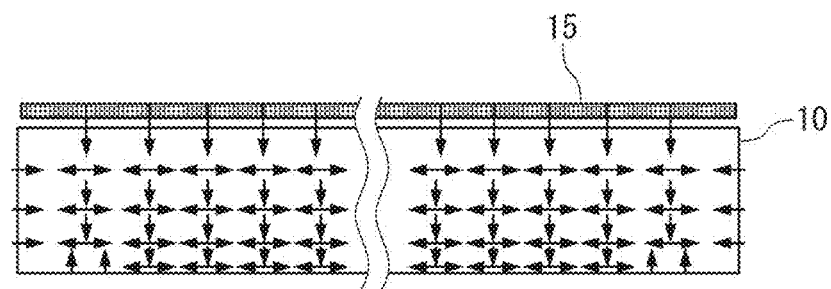
FIG. 4B is a schematic view showing one example of the flow of a resin inside the stack.

In FIG. 4B, one example of the flow of the resin inside the stack 10 is indicated by the arrows. To impregnate the entire stack 10 with the resin, it is important to allow the resin to flow between the layers of the stack 10 and reach the lowermost layer, the fiber substrate 208.

When the resin introduced into the resin diffusion medium 15 is supplied to the uppermost layer, the fiber substrate 201 (FIG. 4A), the resin flows from the fiber substrate 201 to the fiber substrate 202 through the resin channels 25.

Similarly, the resin flows through the resin channels 25 and reaches the fiber substrate 203 which is the layer succeeding the fiber substrate 202.

Then, between the fiber substrates 203, 204 (FIG. 2B), which are stacked with their fiber bundles 21 oriented in different directions from each other, the resin flows through the portions X where the border zones 21B of the fiber substrate 203 and the border zones 21B of the fiber substrate 204 intersect with each other. This is the same between the fiber substrates 204, 205 which are likewise stacked with their fiber bundles 21 oriented in different directions from each other.

The resin having reached the fiber substrate 205 flows from the fiber substrate 205 to the fiber substrate 206, and flows from the fiber substrate 206 to the fiber substrate 207, through the resin channels 25 formed by the fiber substrates 205 to 207 of the fiber substrate group G2 which are stacked with their fiber bundles 21 oriented in the same direction.

The resin further reaches the fiber substrate 208, which is stacked with its fiber bundles 21 oriented in a different direction from the fiber substrate 207, through the intersection portions X between the border zones 21B of the fiber substrate 207 and the border zones 21B of the fiber substrate 208.

While the resin flows between the layers of the stack 10 as described above, the resin concurrently flows in the in-plane directions of the fiber substrates 20 (the length direction and the array direction of the fiber bundles 21) through the clearances Sp2 between the stacked fiber substrates 20 (FIG. 4A). In this process, the longitudinal fibers 22 extending along the in-plane direction (the length direction) at the position of the border zones 21B, the lateral fibers 23 extending along the array direction of the fiber bundles 21, and the thermoplastic powder 24 functioning as a spacer between the fiber substrates 20 each promote the flow of the resin in the in-plane directions.

The resin flows between the layers and in the in-plane directions of each layer as has been described above, so that the resin spreads throughout the entire stack 10. As the differential pressure between the inside of the cavity 14, which is held in a vacuum state, and atmospheric air is applied to the resin, the inside of the fiber bundles 21 is also impregnated with the resin contained in the stack 10.

In this embodiment, the flow of the resin between the layers is secured in each of the fiber substrate groups G1, G2, since the fiber substrates 20, which are oriented with their fiber bundles 21 paralleled in the same direction, are integrated with the border zones 21B between the fiber bundles 21, 21 aligned with one another in each of the fiber substrate groups G1, G2. Accordingly, each layer of the stack 10 including the fiber substrate group G1, the fiber substrate 204, the fiber substrate group G2, and the fiber substrate 208 is sufficiently impregnated with the resin.

That is, since no region is left unimpregnated with the resin in the stack 10, the yield of the fiber-reinforced resin molded article increases.

The orientations and the number of layers of the fiber substrates 201 to 208 of the stack 10 of this embodiment are mere examples, and even when a larger number of the fiber substrates 20 having their fiber bundles 21 oriented in the same direction are successively stacked than in this embodiment, it is possible to sufficiently impregnate each of the fiber substrates 20 with the resin as long as these fiber substrates 20 are integrated with the border zones 21B between the fiber bundles 21, 21 aligned with one another.

According to this embodiment, the number of the fiber substrates 20 successively stacked with their fiber bundles 21 oriented in the same direction is not restricted, which offers greater design flexibility of the fiber-reinforced resin molded article. This also contributes to dynamic characteristics improvement of the fiber-reinforced resin molded article.

Modified Example of First Embodiment

Figure 5:
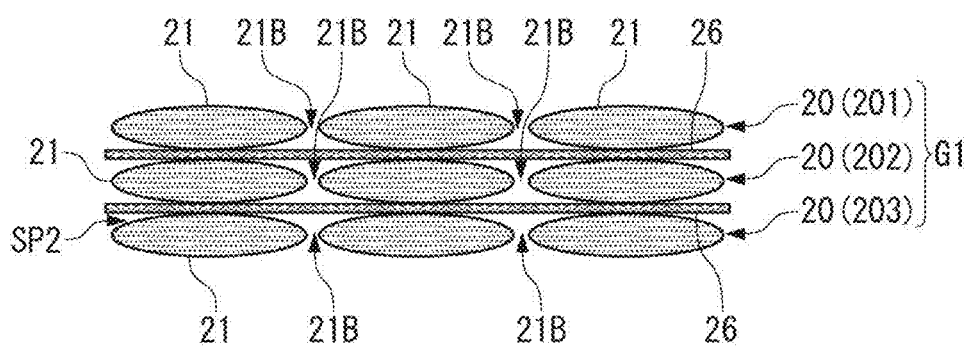
FIG. 5 is a partial cross-sectional view of a fiber substrate group according to a modified example of the first embodiment.

To integrate the fiber substrates 20 in each of the fiber substrate groups G1, G2, a thermoplastic non-woven fabric 26 shown in FIG. 5 or a coarse fabric can be used instead of the thermoplastic powder 24.

The non-woven fabric 26 is disposed between the fiber substrates 20 which are successively stacked with their fiber bundles 21 oriented in the same direction.

The non-woven fabric 26 is a tangle of fibers shaped into a sheet, and allows passage of the resin in the stack direction and the in-plane directions through clearances among the fibers. The non-woven fabric 26 presents a lower flow resistance to the matrix resin than the fiber bundles 21.

For example, the thermoplastic resins given above as examples of the thermoplastic powder 24 can be used as the material of the non-woven fabric 26.

Plasticizing the non-woven fabric 26 by heating can bond together the fiber substrates 20 through the non-woven fabric 26. Even after bonding through plasticization, the non-woven fabric 26 remains to present a low flow resistance to the matrix resin.

Instead of the non-woven fabric 26, an appropriate sheet member which allows passage of the resin in the stack direction and has thermoplasticity can be used. Such a member may be formed in a shape having through-holes or formed in a mesh shape.

Second Embodiment

Next, a second embodiment of the present invention will be described with reference to FIG. 6.

Those components that are the same as in the first embodiment are given the same reference signs.

In the second embodiment, the auxiliary fibers 27 are used to integrate the fiber substrates 20 which are successively stacked with their fiber bundles 21 oriented in the same direction.

Figure 6A:
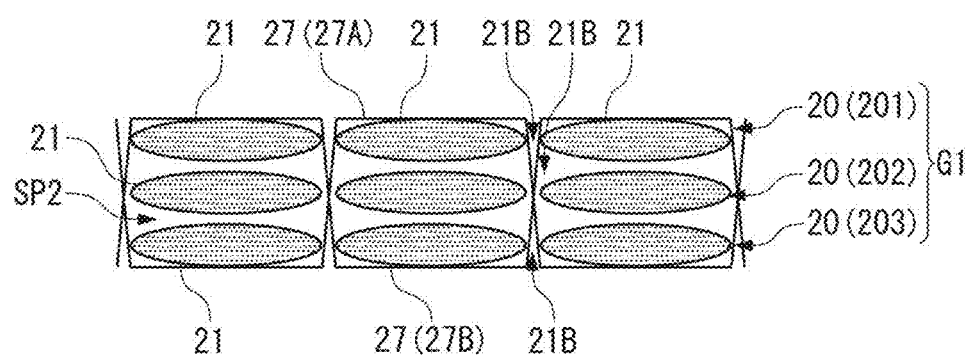
FIG. 6A is a partial cross-sectional view of a fiber substrate group according to a second embodiment.

As shown in FIG. 6A, the fiber substrates 201 to 203 constituting the fiber substrate group G1 are stitched together along the array direction of the fiber bundles by the auxiliary fibers 27 which are passed between the adjacent fiber bundles 21, 21.

The auxiliary fiber 27 is composed of an auxiliary fiber 27A and an auxiliary fiber 27B which are alternately passed in the thickness direction between the fiber substrate 201 located on one surface side of the fiber substrate group G1 and the fiber substrate 203 located on the other surface side of the fiber substrate group G1.

The auxiliary fibers 27A, 27B position and integrate the fiber substrates 201 to 203 so that the border zones 21B coincide with one another.

The fiber substrates 205 to 207 constituting the fiber substrate group G2 are similarly integrated by the auxiliary fibers 27A, 27B.

The auxiliary fibers 27A, 27B prevent displacement of the arrayed fiber bundles 21. On the other hand, the lengths of the auxiliary fibers 27A, 27B are determined with a margin so as not to restrain the fiber substrates 20 from following the shape of a molding die 11.

Figure 8:
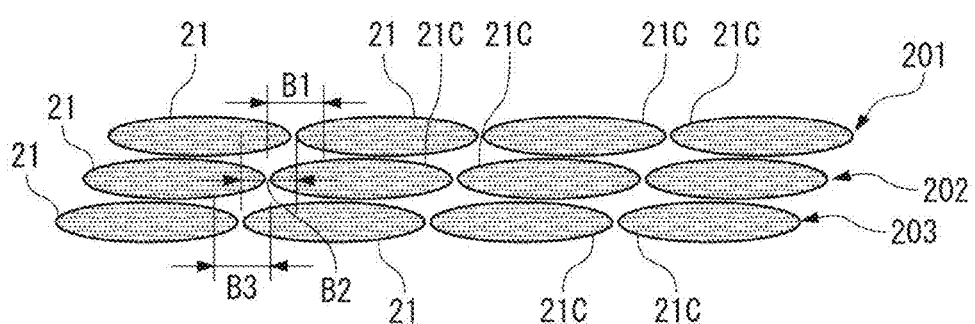
FIG. 8 is a partial cross-sectional view of a fiber substrate group according to a modified example of the present invention.

Even if the fiber bundles 21 are slightly displaced as they follow the shape of the molding die 11 and a shift of the positions of the border zones 21B between the fiber bundles 21 occurs among the fiber substrates 20 as shown in FIG. 8, the flow of the resin between the layers is secured as will be described later.

The auxiliary fibers 27A, 27B may double as the longitudinal fibers 22 and the lateral fibers 23 shown in FIG. 3. That is, it is possible to use the auxiliary fibers 27A, 27B, instead of the longitudinal fibers 22 and the lateral fibers 23, to hold together the fiber bundles 21 and thereby obtain the form of the fiber substrate 20.

Figure 6B:
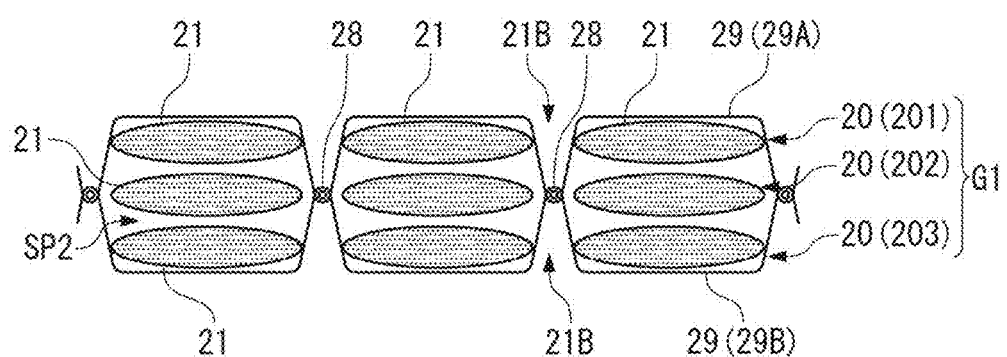
FIG. 6B is a partial cross-sectional view of a fiber substrate group according to a modified example of the second embodiment.

To integrate the fiber substrates 201 to 203, it is also possible to adopt the form of stitching with the auxiliary fibers 28 and the auxiliary fibers 29 as shown in FIG. 6B.

As with the longitudinal fibers 22 shown in FIG. 3, the auxiliary fibers 28 are disposed along the length direction of the fiber bundles 21 between the adjacent fiber bundles 21. That is, the longitudinal fibers 22 can be used as the auxiliary fibers 28.

The auxiliary fibers 29 transverse the fiber bundles 21 in the array direction while passing under the longitudinal fibers 22 in almost the same manner as the lateral fibers 23 shown in FIG. 3. The auxiliary fiber 29 is composed of an auxiliary fiber 29A which is disposed along the fiber substrate 201 located on the one surface side of the fiber substrate group G1 and an auxiliary fiber 29B which is disposed along the fiber substrate 203 located on the other surface side of the fiber substrate group G1, and the auxiliary fiber 29A and the auxiliary fiber 29B are connected with each other through the auxiliary fiber 28.

As the fiber substrates are stitched together and integrated by the auxiliary fibers 27A, 27B shown in FIG. 6A, or by the auxiliary fibers 28 and the auxiliary fibers 29A, 29B shown in FIG. 6B, the flow of the resin is secured among the fiber substrates 20 which are successively stacked with their fiber bundles 21 oriented in the same direction. Accordingly, the entire stack 10 can be sufficiently impregnated with the resin.

It is preferable that stitching with the auxiliary fibers 27A, 27B etc. is performed during the process of manufacturing a roll of the fiber substrate group G1 (or the fiber substrate group G2; the same applies hereafter). A manufacturing facility for manufacturing such a roll of the fiber substrate group includes a device which parallels the fiber bundles 21 in the same direction, a device which holds together the fiber bundles 21 constituting the same fiber substrate 20 and stitching together the stacked fiber substrates 20, and a rotating body which rolls up the fiber substrate group obtained by stitching.

Figure 7:
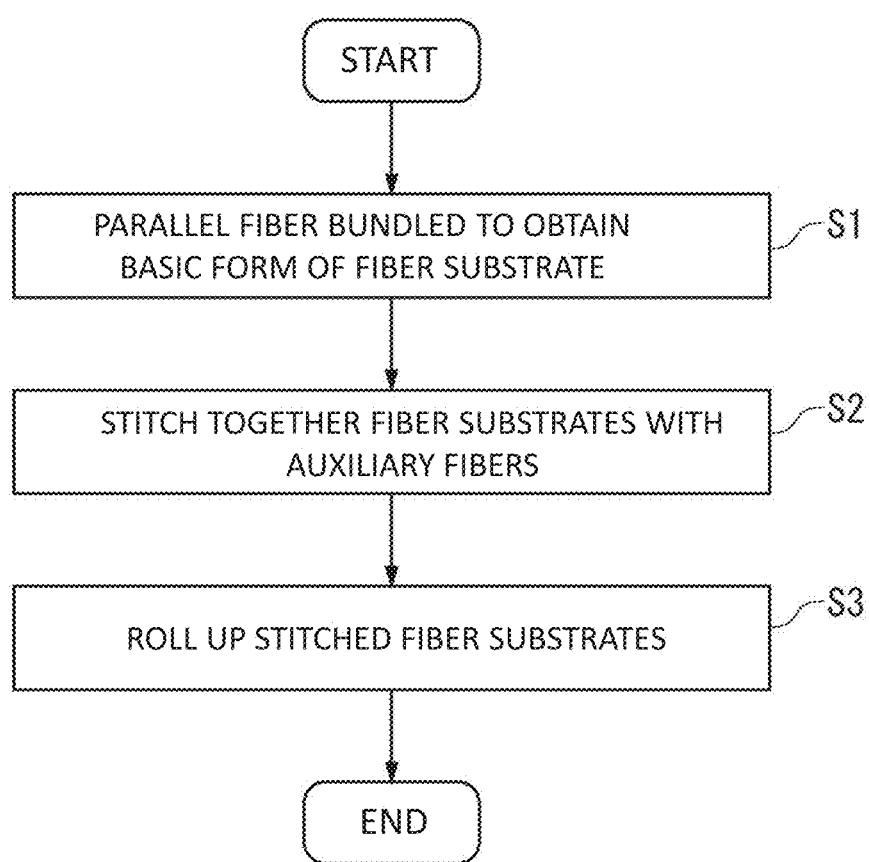
FIG. 7 is a view showing steps of manufacturing a roll of the fiber substrate group integrated by stitching.

Steps of manufacturing a roll of the fiber substrate group are shown in FIG. 7. First, the fiber bundles 21 are arrayed so as to be paralleled in the same direction to obtain the basic form of the fiber substrate 20 (step S1). The fiber bundle groups 210 (FIG. 3) in an amount equivalent to the number of the fiber substrates 201 to 203 to be stacked as the fiber substrate group G1 are prepared.

Next, needles with the auxiliary fibers 27A, 27B respectively passed therethrough are moved in the array direction of the fiber bundles 21 to pass the auxiliary fibers 27A, 27B between the fiber bundles 21, 21 of each of the fiber substrates 201 to 203 and stitch together the fiber substrates 201 to 203 (step S2).

If publicly-known image processing is used to locate the position between the fiber bundles 21, 21 through which the needle is to be passed, the needle can be accurately passed between the fiber bundles 21, 21. If a round-tipped (e.g., spherical-tipped) needle is used, the needle tip pushes away the fiber bundles 21 and enters between the fiber bundles 21, 21, so that, even if the pitch of the fiber bundles 21 is somewhat irregular, the auxiliary fibers 27 can be smoothly passed between the fiber bundles 21, 21.

Then, the stitched fiber substrates 201 to 203 are rolled up (step S3) to obtain a roll of the fiber substrate group composed of the fiber substrates 20 which are stacked with their fiber bundles 21 oriented in the same direction as well as their border zones 21B aligned with one another.

In the case where the auxiliary fiber 28 and the auxiliary fibers 29A, 29B are used, a roll of the fiber substrate group can be obtained by reeling out the auxiliary fiber 28 along the space between the fiber bundles 21, 21 and moving the needles, with the auxiliary fibers 29A, 29B respectively passed therethrough, in the array direction of the fiber bundles 21.

A roll of the fiber substrate group can also be obtained even when the thermoplastic powder 24 is used for integrating the fiber substrates 20 constituting the fiber substrate group.

That is, it is possible to obtain a roll of the fiber substrate group, which is rolled up with the fiber substrates 20 bonded together, by aligning the border zones 21B among the fiber bundle groups 210, which are prepared in an amount equivalent to the number of the fiber substrates 20 to be stacked, and plasticizing the thermoplastic powder 24 adhering to the surfaces of the fiber bundles 21 by heating.

When the thermoplastic non-woven fabric 26 is used, it is also possible to obtain a roll of the fiber substrate group, which is rolled up with the fiber substrates 20 bonded together, by aligning the border zones 21B among the fiber bundle groups 210, which extend in parallel with one another in the stack direction, and plasticizing the non-woven fabric 26 interposed between the fiber bundle groups 210 by heating.

Otherwise, the configurations presented in the above embodiments can be selectively adopted or appropriately modified into other configurations within the scope of the present invention.

FIG. 8 shows border zones B1, B2, B3 of the respective stacked fiber substrates 201 to 203. These border zones B1, B2, B3 each include the end edges 21C in the width direction of the fiber bundles 21, 21 adjacent to each other in the array direction.

As shown in FIG. 8, relative to the position of the border zone B1 of the fiber substrate 201, the position of the border zone B2 of the fiber substrate 202 has shifted in the array direction of the fiber bundles 21.

Moreover, relative to the position of the border zone B2 of the fiber substrate 202, the position of the border zone B3 of the fiber substrate 203 has shifted in the array direction of the fiber bundles 21.

In terms of the relation between the fiber substrates 201, 202, a part of the border zone B2 is included in a projection area of the border zone B1 projected in the stacking direction of these fiber substrates 201, 202. Accordingly, the resin flows between the fiber substrates 201, 202. In terms of the relation between the fiber substrates 202, 203, a part of the border zone B3 is included in a projection area of the border zone B2 projected in the stack direction of these fiber substrates, so that, again, the resin flows between the fiber substrates 202, 203.

As described above, as long as the resin flows sequentially between the layers of the fiber substrate group, a shift of the position of the border zone between the adjacent fiber bundles among the stacked fiber substrates is also acceptable.

The present invention can be widely applied to fiber substrates which are used for a resin injection method in which a resin is injected into the cavity 14 by depressurizing the inside of the cavity 14. For example, the present invention is also applicable to a case where the stack 10 is molded under pressure applied from the outside of the molding die which houses the entire stack 10, as long as the resin is injected by depressurizing the inside (cavity) of the molding die.

The present invention also embraces the use of a thermoplastic resin as the matrix resin with which the fiber substrates are to be impregnated.

The fiber-reinforced resin molded article according to the present invention can be used not only as a member of an aircraft but also as a blade of a windmill, for example.

What is claimed is:

1. A fiber substrate stacking method for stacking a plurality of fiber substrates each of which has arrayed fiber bundles and is a material composing a fiber-reinforced resin along with a matrix resin, wherein the plurality of fiber substrates are integrated in a state where border zones between the fiber bundles adjacent to each other in an array direction are aligned with one another among the fiber substrates which are successively stacked with their fiber bundles oriented in a same direction.

2. The fiber substrate stacking method according to claim 1, wherein the plurality of fiber substrates are bonded together by heating and plasticizing particles of a thermoplastic resin scattered over surfaces of the fiber bundles.

3. The fiber substrate stacking method according to claim 1, wherein the plurality of fiber substrates are bonded together by disposing a sheet, which has thermoplasticity and allows passage of the matrix resin at least in a thickness direction of the fiber substrates, between the fiber substrates and heating and plasticizing the sheet.

4. The fiber substrate stacking method according to claim 1, wherein the fiber bundles are arrayed at a regular pitch.

5. The fiber substrate stacking method according to claim 1, wherein:
the fiber substrate has a first fiber and a second fiber that hold together the fiber bundles in an arrayed state; and
the first fiber extends along a length direction of the fiber bundles at the position of a border zone while the second fiber extends along the array direction of the fiber bundles.

6. The fiber substrate stacking method according to claim 1, wherein the arrayed fiber bundles of the fiber substrate are aligned in one direction, and the border zones of stacked adjacent fiber substrates are aligned in a stacking direction.

7. The fiber substrate stacking method according to claim 1, wherein a border zone of each of the fiber substrates includes a channel that is formed in a thickness direction of a stacked body comprising the stacked plurality of fiber substrates, the channel configured for passage of the matrix resin.

8. A manufacturing method of a roll of a fiber substrate group in which a plurality of fiber substrates, each of which has arrayed fiber bundles and is a material composing a fiber-reinforced resin along with a matrix resin, are successively stacked with their fiber bundles oriented in the same direction by the fiber substrate stacking method according to claim 1, the manufacturing method comprising the steps of:
obtaining a form of the plurality of fiber substrates using the fiber bundles;
integrating the plurality of fiber substrates in a state where border zones between the fiber bundles adjacent to each other in an array direction are aligned with one another; and
rolling up the fiber substrate group including the integrated plurality of fiber substrates.

9. The manufacturing method of a roll of a fiber substrate group according to claim 8, wherein, in the step of integrating, the plurality of fiber substrates are stitched together with fibers, which are passed between the fiber bundles adjacent to each other in the array direction, in a state where the border zones are aligned with one another.

10. A fiber-reinforced resin molding method comprising the steps of:
forming a stack of a plurality of fiber substrates including the fiber substrates which are stacked by the fiber substrate stacking method according to claim 1; and depressurizing an inside of a cavity, where the stack is disposed, and injecting a matrix resin into the cavity to impregnate each of the fiber substrates constituting the stack with the matrix resin.

11. A fiber-reinforced resin molding method comprising the steps of:
    forming a stack of a plurality of fiber substrates including the fiber substrates of the roll of the fiber substrate group manufactured by the manufacturing method according to claim 8; and
    depressurizing an inside of a cavity, where the stack is disposed, and injecting a matrix resin into the cavity to impregnate each of the fiber substrates constituting the stack with the matrix resin.

12. The fiber-reinforced resin molding method according to claim 10, wherein, before impregnating each of the fiber substrates, a resin diffusion medium, which presents a lower flow resistance to the matrix resin than the fiber substrates, is disposed on top of the stack.

13. The fiber-reinforced resin molding method according to claim 11, wherein, before impregnating each of the fiber substrates, a resin diffusion medium, which presents a lower flow resistance to the matrix resin than the fiber substrates, is disposed on top of the stack.

* * * * *